United States Patent
Menard (12)

(10) Patent No.: US 10,619,891 B2
(45) Date of Patent: Apr. 14, 2020

(54) SOLAR TRACKER

(71) Applicant: Helioslite, Le Bourget du Lac (FR)

(72) Inventor: Etienne Menard, Voglans (FR)

(73) Assignee: Helioslite, Le Bourget du Lac (FR)

( * ) Notice: Subject to any disclaimer, the term of this patent is extended or adjusted under 35 U.S.C. 154(b) by 2 days.

(21) Appl. No.: 16/097,289

(22) PCT Filed: Apr. 25, 2017

(86) PCT No.: PCT/IB2017/000469
§ 371 (c)(1),
(2) Date: Oct. 29, 2018

(87) PCT Pub. No.: WO2017/187253
PCT Pub. Date: Nov. 2, 2017

(65) Prior Publication Data
US 2019/0137143 A1    May 9, 2019

Related U.S. Application Data

(60) Provisional application No. 62/329,412, filed on Apr. 29, 2016.

(51) Int. Cl.
*F24S 30/458* (2018.01)
*F24S 30/48* (2018.01)
(Continued)

(52) U.S. Cl.
CPC ............ *F24S 30/458* (2018.05); *F24S 30/45* (2018.05); *F24S 30/48* (2018.05);
(Continued)

(58) Field of Classification Search
CPC .......... F24S 30/458; F24S 30/45; F24S 30/48; F24S 2030/136; F24S 2030/131; F24S 2030/137; Y02E 10/47
(Continued)

(56) References Cited

U.S. PATENT DOCUMENTS 7,115,851 B2 * 10/2006 Zhang .................... F24S 23/77
250/203.4
8,381,718 B1 * 2/2013 Luconi .................. F24S 30/452
126/606
(Continued)

FOREIGN PATENT DOCUMENTS

DE  202006015917 U1  1/2007
EP     1860387 A1  11/2007
(Continued)

OTHER PUBLICATIONS

Jul. 28, 2017, International Search Report of PCT/IB2017/000469.

*Primary Examiner* — Seung C Sohn
(74) *Attorney, Agent, or Firm* — Banner & Witcoff, Ltd.

(57) ABSTRACT

The present invention relates to a tracking photovoltaic solar system comprising at least a tracker unit maintaining an array of photovoltaic modules (101) aligned to the sun during the course of the day. The tracker unit includes: a support structure (100), said support structure comprising a plurality of elongated elements (105) supporting said array of photovoltaic modules and a torque tube (104) for rigidly supporting said plurality of elongated elements and arranged to rotate along a first rotational axis (106), a pole structure (200) operably connected to said support structure, having an upper part rotationally fixed along said first rotational axis (106) on said support structure, and a lower part rotationally connected along a second rotational axis (204) orthogonal to the first rotational axis on foundations (500), and a steering mechanism (300) mechanically coupling together said first and said second rotational axis for rotating said support structure and said operably connected pole structure around said first and second rotational axis in the same movement.

26 Claims, 8 Drawing Sheets

(51) Int. Cl.
*F24S 30/45* (2018.01)
*F24S 30/00* (2018.01)

(52) U.S. Cl.
CPC .... *F24S 2030/131* (2018.05); *F24S 2030/136* (2018.05); *F24S 2030/137* (2018.05); *Y02E 10/47* (2013.01)

(58) Field of Classification Search
USPC ...................................................... 250/203.4
See application file for complete search history.

(56) References Cited

U.S. PATENT DOCUMENTS

| | | |
|---|---|---|
| 2007/0215199 A1 | 9/2007 | Dold et al. |
| 2009/0235975 A1 | 9/2009 | Shingleton |
| 2010/0126497 A1 | 5/2010 | Taylor et al. |
| 2010/0180883 A1 | 7/2010 | Oosting |
| 2012/0006317 A1 | 1/2012 | Sade |

FOREIGN PATENT DOCUMENTS

| | | |
|---|---|---|
| EP | 2792967 A2 | 10/2014 |
| GB | 2499655 A | 8/2013 |

\* cited by examiner

View from the sun position:

Figure 7B

View from the sun position:

SOLAR TRACKER

FIELD OF THE INVENTION

This invention is in the general field of solar power generation.

More specifically, one particularly important, although nonexclusive, application of the invention is in the field of photovoltaic solar tracker systems capable of tracking the sun during the course of the day to maximize the energy output of photovoltaic modules.

PRIOR ART DISCUSSION

The most basic photovoltaic solar tracker systems are single axis trackers.

These systems provide means for rotating an array of photovoltaic solar modules around a fixed axis providing a way for roughly orienting the modules toward the sun.

The fixed rotation axis of these single axis trackers may be vertical, horizontal or at an inclined angle.

One exemplary design of single axis tracker rotating an array of photovoltaic solar around an axis at an inclined angle is described in U.S. Pat. No. 7,888,588. In this fixed-tilt single axis tracker design, multiple tracker units rotate in unison around a rotation axis which has a fixed inclined angle. Each tracker unit sub-assembly comprises a structure supporting an array of photovoltaic solar modules rotating around two fixed pivot points which define the main rotation axis of each tracker unit. Drive elements and drive element couplers connect the different tracker unit sub-assemblies to force them to rotate in unison.

This design provides a significant improvement of the tracking accuracy over prior art single axis trackers rotating around a fixed horizontal axis.

However, the kinetic motion of these fixed-tilt trackers, rotating around an axis having an inclined angle, induces a significant increase of self-shading losses between the photovoltaic solar arrays of each tracker unit resulting in an increase of the land required for the plant.

In addition, for fixed-tilt trackers the arrays of photovoltaic modules cannot be moved to a safe position during wind storms with the arrays placed in a flat horizontal position.

Moreover, the rotation of the arrays of photovoltaic modules around an inclined fixed-tilt axis induces an increase of the distance required between the pivot points above the ground in order to avoid mechanical interferences of the arrays of photovoltaic modules with the soil.

An increase of the overall height of the arrays of photovoltaic modules directly translates into higher wind loads on the tracker structure and the foundations, thus increasing the cost.

It is also known dual-axis photovoltaic solar tracker systems which provide means for more accurately aligning the arrays of photovoltaic modules to the sun but at the expense of a significant increase in system complexity.

This increase in complexity translates into higher costs, and the increase in cost is typically too high to compensate the small gain obtained in energy production.

An exemplary design described in the patent application PCT/IB2014/000114 addresses many of the limitations of prior-art dual axis trackers, but the kinetic of these "tilt and roll" trackers does not address the general problem of poor ground coverage ratio of dual-axis tracking systems.

Moreover, the higher energy gain provided by dual-axis trackers can only be realized with solar plants with a field layout using a low ground coverage ratio. The use of a low ground coverage ratio indirectly translates into further cost increase as more land area is required to install the solar power plant and longer electrical cables are necessary to interconnect the tracker units in the field.

There is thus a need for an alternative photovoltaic solar tracker system which positively addresses the above listed limitations of the prior art single and dual axis tracker systems.

To this end the present invention mainly proposes a tracking photovoltaic solar system comprising at least tracker unit maintaining an array of photovoltaic modules aligned to the sun during the course of the day, wherein said tracker unit includes:

a support structure comprising a plurality of elongated elements supporting said array of photovoltaic modules and a torque tube for rigidly supporting said plurality of elongated elements and arranged to rotate along a first rotational axis, a pole structure operably connected to said support structure, having an upper part rotationally fixed along said first rotational axis on said support structure, and a lower part rotationally connected along a second rotational axis orthogonal to the first rotational axis on foundations, said foundations and a steering mechanism mechanically coupling together said first and said second rotational axis for rotating said support structure and said operably connected pole structure around said first and second rotational axis in the same movement.

In some advantageous embodiment, it is also and/or further proposed a system including one or more of the following features:

- the upper part of the pole structure comprises a first pair of pivot points connected to the torque tube and defining the first rotational axis of said support structure;
- the lower part of the pole structure comprises a second pair of pivots points connected to the foundations and defining the second rotational axis;
- the steering mechanism comprises an upper and a lower steering arm structures;
- the upper steering arm structure comprises an upper arm element having an upper end and a first pivot articulation at said upper-end operably connected to the torque tube, said first pivot articulation having a pivoting axis orthogonal to said first rotational axis;
- the upper arm element of said upper steering arm structure having a lower end, it comprises a spherical joint at said lower end operably connected to the lower steering arm structure;
- the lower steering arm structure having a lower end, it comprises a pair of steering pivot points at said lower end operably connected to the foundations, said steering pivot points having a pivoting axis orthogonal to the second rotational axis;
- the system comprises a drive assembly, comprising—a driver operably connected on one side to a mounting structure fixed onto the foundations and on the other side to said lower steering arm structure of the steering mechanism, for inducing motion to said support structure;
- the pole structure of the tracker unit comprises two pairs of mechanical beam elements, namely a first pair and a second pair, each mechanical beam element having upper and lower ends, with the upper ends of one of each pair of said mechanical beam elements connected together to a first pivot point of said first pair of pivot points connected to said torque tube, with the upper ends of the other one of each pair of said mechanical beam elements connected together to a second pivot point of said first pair of pivot points connected to said torque tube, with the lower ends of one of each pair of said mechanical beam elements connected together to a first pivot point of said second pair of pivot points, and with the lower ends of the other one of each pair of said mechanical beam elements connected together to a second pivot point of said second pair of pivot points;

the lower steering arm of said steering mechanism comprises a pair of steering beam elements having upper and lower ends, with the upper ends of both steering beam elements operably connected to the upper steering arm with a spherical joint, and with the lower ends of the beam elements connected to the foundation with a third pair of pivot points;

the system comprises a plurality of tracker units driven by a common driver assembly comprising a single driver and multiple transmission beams connected in a serial manner with pivot or spherical joints at their ends;

the lengths of the upper and lower steering arm structures of the steering mechanism are arranged to provide self-locking property to the tracking system;

the lengths of the upper and lower steering arm structures are arranged to obtain a geometrical orthogonality relation between the main longitudinal axis of these two structures (upper and lower steering arm structures) when the tracker is moved to its maximum angular rotation limits at sunrise or sunset;

the system comprises a plurality of tracker units, connected together by a tracker linkage beam and wherein it further comprises shock absorbing mechanical bumpers attached to each tracker unit pole structure and a mechanical locking bracket attached to each tracker linkage beam in order to mechanically lock the rotation of each tracker unit when they are moved to their end of rotation position limits;

the system comprises a plurality of tracker units, connected together by tracker linkage beams and driven in unison by a common drive assembly comprising a common driver and a self-locking drive mechanism arranged to block the orientation of the trackers in a determined position minimizing the wind influence on said common driver;

the self-locking drive mechanism comprises a plurality of mechanical locks associated to an extremity of a respective linkage beam operably connected to the lower steering arm of each tracker unit;

each mechanical lock is arranged to engage in a corresponding locking plate rigidly connected to the chassis structure of each tracker unit to block the rotation of each tracker unit in a determined position, said mechanic locks being driven simultaneously by said common driver;

the self-locking drive mechanism further comprises a steering actuation mechanism arranged to release the mechanical locks on demand, actuated by tension or compression forces applied by the common driver;

the weight distribution of the transmission beams is unbalanced to obtain a moment gravity forces which brings automatically back the mechanical locks into their locking position;

the tracker upper assembly formed by an array of photovoltaic modules and the module array structure having a center of gravity, said center of gravity is arranged to remains positioned to the south of the lower pivot point of the tracker pole structure.

the second pair of pivot points being aligned along the East/West direction, and the third pair of pivot points being aligned along the direction North/South, the tracker upper assembly formed by the array of photovoltaic modules and the module array support structure having a center of gravity, the relative position of said center gravity is arranged in such a way that during normal operation of the tracker system said center of gravity point remains positioned to the North of the second pair of pivot points of the tracker pole structure;

the length of the upper or lower steering arm structures are adjustable between a minimum and a maximum length, in order to further optimize the motion trajectories of the tracker units during summer and winter seasons;

the minimum length of said adjustable steering arm structures, is selected in order to drive the support structure to a flat horizontal position;

the foundations of the tracking system comprises a chassis structure which comprises a tubular structure, a mounting structure for the driver, said mounting structure being operably connected to said chassis structure;

the foundation of each tracker unit being disposed on a ground, it is secured to the ground by operably connecting each tracker unit foundation to anchor elements buried into the ground underneath each tracker unit;

each elongated element of said plurality of elongated elements supporting said array of photovoltaic modules comprises a pair of module quick clamp support elements, wherein each module quick clamp support element comprises a first fixture element for supporting a long edge or rail of a photovoltaic module, a second fixture element for attaching the quick clamp support element to the torque tube and a third fixture element supporting a short edge or rail of the photovoltaic module.

BRIEF DESCRIPTION OF THE DRAWINGS

The above and other features and advantages of the present invention will become apparent upon review of the following summarized and detailed descriptions taken into conjunction with the accompanying drawings in which.

DETAILED DESCRIPTION OF THE INVENTION

The invention essentially provides a tracking photovoltaic solar system comprising at least a one tracker unit relying on a "Rocking" and "Rolling" kinetic to maintain an array of photovoltaic modules aligned to the sun during the course of the day. This specific and original new tracker unit is sometimes referred to here after as "a one and a half axis" tracker unit.

In order to simplify the description of the invention, the tracking system of the invention is systematically described assuming that the system is installed at a site located in the Northern hemisphere, however this tracking system may also be installed on sites located in the Southern hemisphere after performing a rotation of 180 degrees.

Figure 1A:
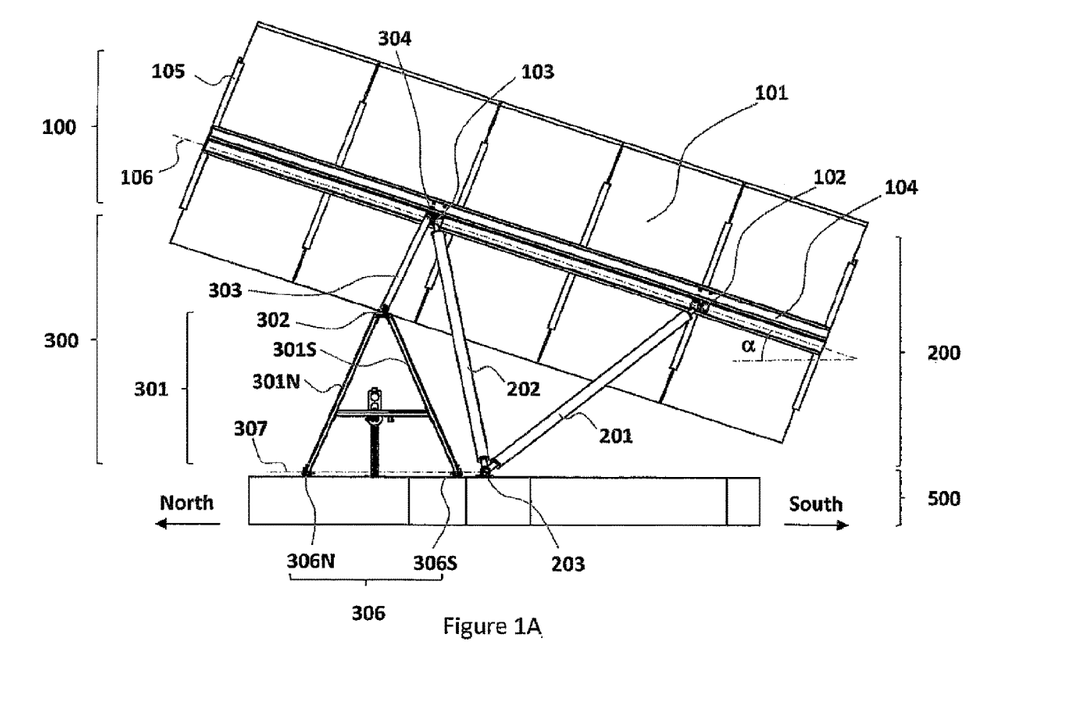
FIGS. 1A & 1B show two diagrams of a first embodiment of a photovoltaic solar tracker unit according to the invention as more particularly described here, classically disposed on the ground according to the North/South direction for tracking the sun, as viewed respectively from the West and North directions.
Figure 1B:
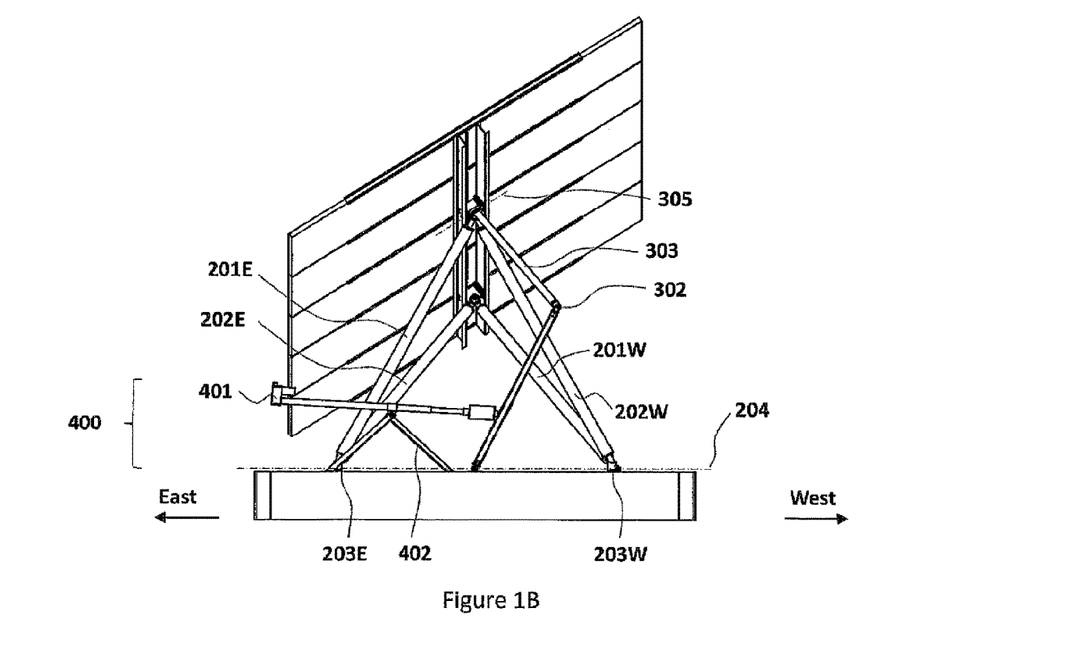

FIGS. 1A and 1B illustrate diagrams of an embodiment of a 1.5-axis photovoltaic solar tracker unit of the invention.

The tracker unit includes a module support structure 100 comprising an array of module support elements 105 supporting an array of photovoltaic modules 101 (of a known type), a primary longitudinal support or torque tube 104 for supporting said array of support beam elements 105, and primary rotating means for rotating said torque tube 104 around a primary rolling rotation axis or first rotational axis 106 having a variable inclination angle α.

It further comprises a pole structure 200 comprising a first pair of pivot points (102 & 103) on its upper side, wherein said pair of first pivot points 102 & 103 defines the primary "Rolling" rotation axis 106 of said torque tube, and on its lower end a second pair of pivot points 203E & 203W defining a secondary "Rocking" rotation axis or second rotational axis 204 for rotating the pole structure 200 and the operably connected torque tube 104 and said module array support structure (100), wherein said secondary rotation axis 204 is orthogonal to said primary rotation axis, and wherein said second pair of pivot points 203Z & 203W on the lower end of said pole structure 100 are fixed to the foundations 500 of the tracker unit.

The foundations are here and for example a block of concrete fixed, anchored or disposed on the ground.

The tracker also comprises a steering mechanism 300 for rotating the module support structure 100.

The steering mechanism is actioned by a motor, for instance an electronic motor known per se, which is controlled by a computer (not represented) adequately programmed in a way easily undertaken by the man skilled in the art.

The steering mechanism 300 is mechanically coupling the rotation of said primary axis 106 to said secondary axis 204 of said 1.5-axis photovoltaic solar tracker. It comprises upper 303 and lower 301 steering arm structures. The upper steering arm structure 303 comprises an upper arm element 303A, for instance a metallic tube, having a pivot point 304 at its upper-end operably connected to the torque tube 104 having a pivoting axis 305 orthogonal to said primary rotation axis 106.

The upper steering arm element 303A further comprises a spherical joint 302 at its lower end operably connected to said lower steering arm structure 301, wherein said lower steering arm structure 301 comprises a pair of steering arm elements 301N and 301S connected to a pair of pivot points 306N & 306S at their lower end operably connected to the foundation 500 of said tracker having a pivoting axis 307 orthogonal to said secondary axis 204 of said pole structure 200.

According to this embodiment of the invention, the tracker also comprises a drive assembly 400, comprising a driver 401 for instance an electronic motor controlling a pole, operably connected on one side to a mounting structure 402 (i.e. a support having two legs disposed triangularly and connected to the foundations) fixed onto the tracker foundation 500 and on the other side to said lower steering arm elements 301 of said steering mechanism 300, providing a mean for inducing a "Rocking" and "Rolling" motion to said photovoltaic module support structure 100.

In an embodiment of the invention, the pole structure 200 of the tracker unit may comprise two pairs of mechanical beam elements 201E & 201W and 202E & 202W each having upper and lower ends, with the upper ends of 201W & 202E elements connected together to the first pivot point 102 of the torque tube 104, with the upper ends of 201E & 202W elements connected together to the second pivot point 103 of the torque tube 104, with the lower ends of 201E & 202E elements connected together to the first pivot point 203E of the pole structure 200, and with the lower ends of 201W & 202W elements connected together to the second pivot point 203W of the pole structure 200.

In this embodiment of the invention, the pole structure 200 comprises two pairs of beam elements (metallic tubes for instance) providing a mechanically robust and light-weight mechanical structure and an efficient means for transferring to the foundation 500 the dead weight of the upper structure and the forces resulting from wind loads on the surface of the array of the photovoltaic modules 101.

In another embodiment of the invention, the lower steering arm 301 of the steering mechanism 300 may comprise a pair of beam elements 301N & 301S having upper and lower ends, with the upper ends of both beam elements 301N & 301S operably connected to the upper steering arm 303 with a spherical joint 302, and with the lower ends of the beam elements 301N & 301S connected to the foundation 500 with a pair of pivot points 305N and 305S.

In this specific embodiment of the invention, the shape of the pair of beam elements 301N & 301S is triangle which renders it a mechanically robust and lightweight mechanical structure, which provides an efficient mean for transferring the actuation force of the drive system 400 to the upper steering arm 303 of the steering mechanism 300.

The driver 401 of the drive system 400 system is here formed by an axe or tube actioned by an hydraulic or electronic jack pushing or pulling from a fixed point on a center bar fixed on the two beam elements, for instance on their middle part.

In an embodiment of the invention, multiple tracker units may be driven by a common driver.

Figure 2A:
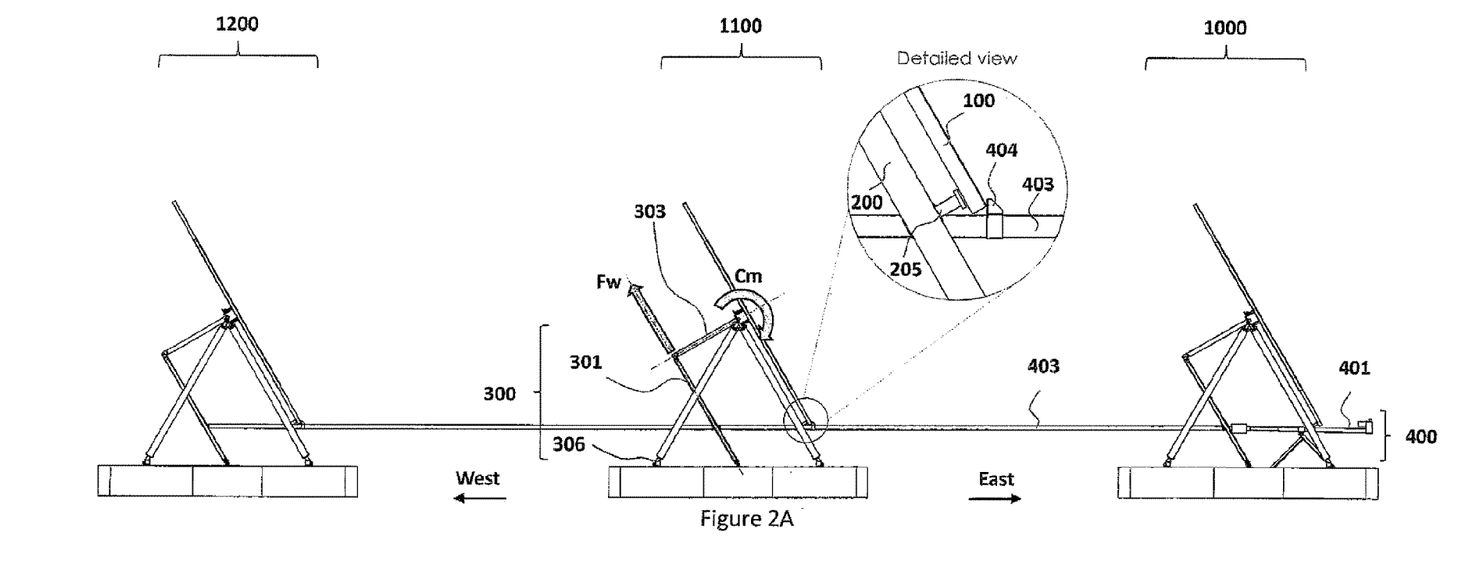
FIGS. 2A & 2B illustrate diagrams of a second embodiment of tracker system of the invention having a single row comprising three mechanically linked photovoltaic solar tracker units similar to the tracker unit of FIGS. 1A and 1B, as viewed respectively from the South and West directions.
Figure 2B:
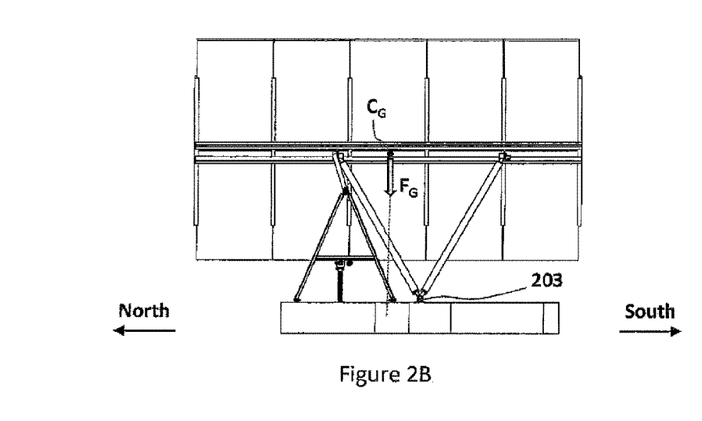

FIGS. 2A & 2B illustrate diagrams of such an embodiment of the invention with a row of three mechanically linked 1.5-axis (one and half axis) photovoltaic solar tracker units 1000, 1100 & 1200 which are driven, in unison by a common drive assembly 400 comprising a single driver 401 and multiple transmission beams 403.

The transmission beams 403 are connected in a serial manner with pivot or spherical joints at their ends. The length of each transmission beam 403 may be adjustable in order to accommodate some variation in height if the ground of the installation field is not flat.

In a preferred embodiment of the invention, the lengths of the upper 303 and lower 301 steering arms of the steering mechanism (300) may be optimized in order to give the mechanical system an advantageous self-locking property.

For this purpose, the lengths of the upper 303 and lower 301 steering arms are selected to obtain a geometrical orthogonality relation between the main longitudinal axis of these two elements 301 & 303 (each one elongated along an axis) when the tracker is moved to its maximum angular rotation limits at sunrise or sunset. When this orthogonality condition is met, the force Fw—induced by the moment Cm of the wind loads transferred by the module support structure 100 and transmitted by the upper steering arm (303) to the lower steering arm 301—has a direction which becomes perfectly parallel to the main longitudinal axis of the lower steering arm 301.

As an advantageous consequence, the integrality of the force Fw is thus transmitted entirely to the foundation 500 through the lower pair of pivot points 306 of the lower steering arm 301, and thus no force is transmitted back to the tracker unit driving beam 403 and common driver 401.

This represents an important distinguishing feature over prior-art fixed horizontal or inclined tilt tracking systems which do not have this specific self-locking mechanical property.

In these prior-art tracking systems, their linkage beams and common driver need to be significantly oversized as the sum of the moment forces induced by wind loads on each tracker unit are summed and transferred back by the first linkage beam to their common driver.

With the above described self-locking property of the herein disclosed invention, smaller linkage beams 403 and a less powerful common driver 401 may be used as these elements need to only overcome smaller wind loads obtained during normal operating condition of the system.

When the system is exposed to higher wind speeds, the tracker units may be placed in their angular rotation limit positions where the herein disclosed steering mechanism exhibit a self-locking attribute and efficiently transfers all of the wind loads each tracker unit into their foundations instead of transferring these loads back to the system common driver 401.

In another embodiment of the invention, a shock absorbing mechanical bumpers 205 is attached to each tracker unit pole structure 200 and a mechanical locking bracket 404 is attached to each tracker linkage beam 403 in order to mechanically lock the rotation of each tracker unit when they are moved to their end of rotation position limits.

Such mechanical bumpers 205 and mechanical locking bracket 404 may be installed on each tracker unit in order to lock their rotation when they reach their mechanical limit pointing toward East, or their limit pointing toward West or both rotation limits.

In a preferred embodiment of the invention, the relative position of the center of gravity of the tracker upper assembly—comprising the array of photovoltaic modules 101 and the module array support structure 100—is optimized in such a way that during normal operation of the tracker system this center of gravity point remains positioned to the North of the lower pivot point 203 of the tracker pole structure 200.

When this geometrical condition is met, the overall reliability of the system is improved as gravity forces ($F_G$) are helping the common driver 401 when the trackers are moving toward their end of travel limits where the herein disclosed steering mechanism 300 exhibit a self-locking property.

If under extreme conditions the linkage beam 403 becomes loose or broken, then the tracker units which are connected in a serial arrangement behind the broken linkage beam will naturally move into a safe wind storm position and the herein disclosed self-locking steering mechanism 300 of the invention will prevent any further rotation of these tracker units.

In yet another embodiment of the invention, the length of the upper steering arm 303 can be made adjustable in order to further optimize the motion trajectories of the tracker units during summer and winter seasons.

Figure 3A:
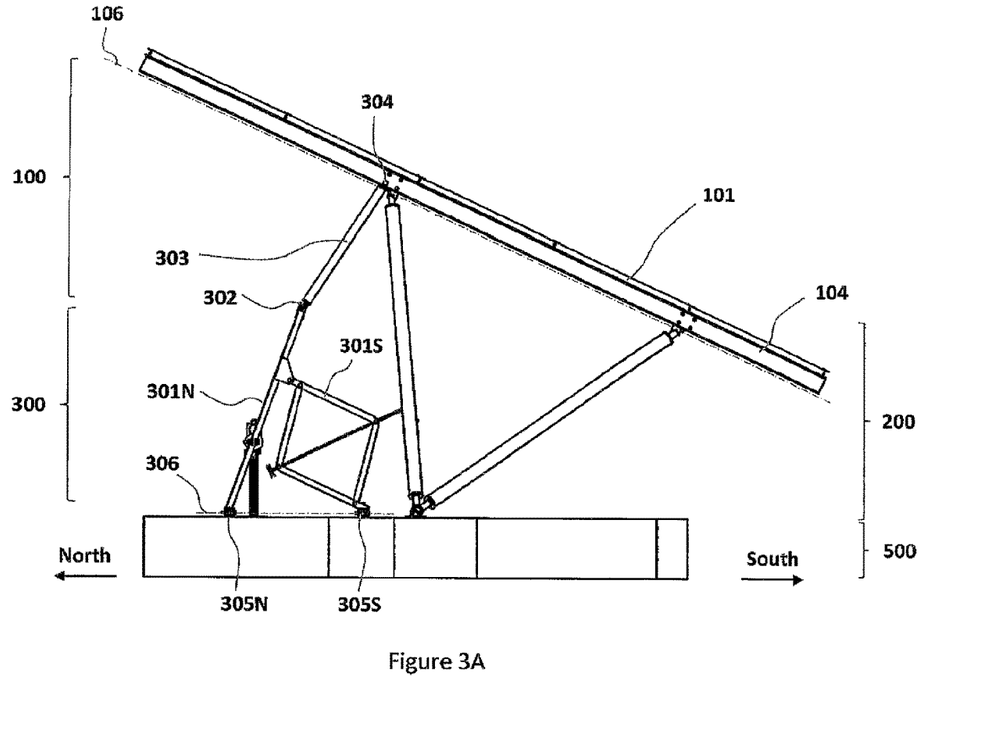
FIGS. 3A & 3B illustrate diagrams of a third embodiment of a photovoltaic solar tracker unit according to the invention, comprising an adjustable steering arm structure, as viewed respectively from the West and North directions.
Figure 3B:
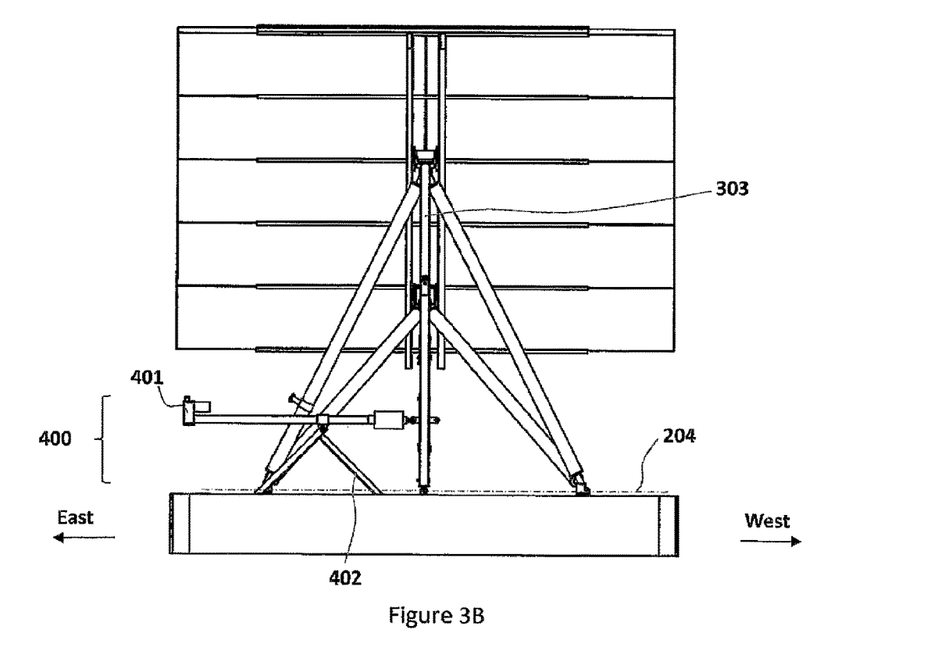

FIGS. 3A & 3B illustrate diagrams of such an embodiment in which one the beam element of the lower steering arm 301 of the steering mechanism 300 is replaced with an adjustable length element such as a scissor jack 301S.

Other adjustable length mechanical elements such as a jack post type beam may also provide the same functionality.

In yet another embodiment of the invention, a common driving mechanism is used to mechanically couple these adjustable length mechanical elements, thus providing a mean for adjusting the length of these elements in a centralized manner.

The adjustment of the length of these elements may be done manually by an operator, or automatically with the use of an automatic driver which may comprise electric motors.

In another embodiment of the invention, the minimum length of the adjustable length mechanical elements is selected in order to drive the module support structure 100 to a flat horizontal position. This safe position may be then used instead of the previously described end-of travel limits position if the tracking system is installed on a site exposed to very high wind storms.

In a similar manner, the tracker torque tube 104 is equipped with multiple pre-defined attachment positions which may be used for modifying the pivoting position of the upper pivot point 304 of the upper steering arm 303 on the tracker torque tube 104.

Figure 4A:
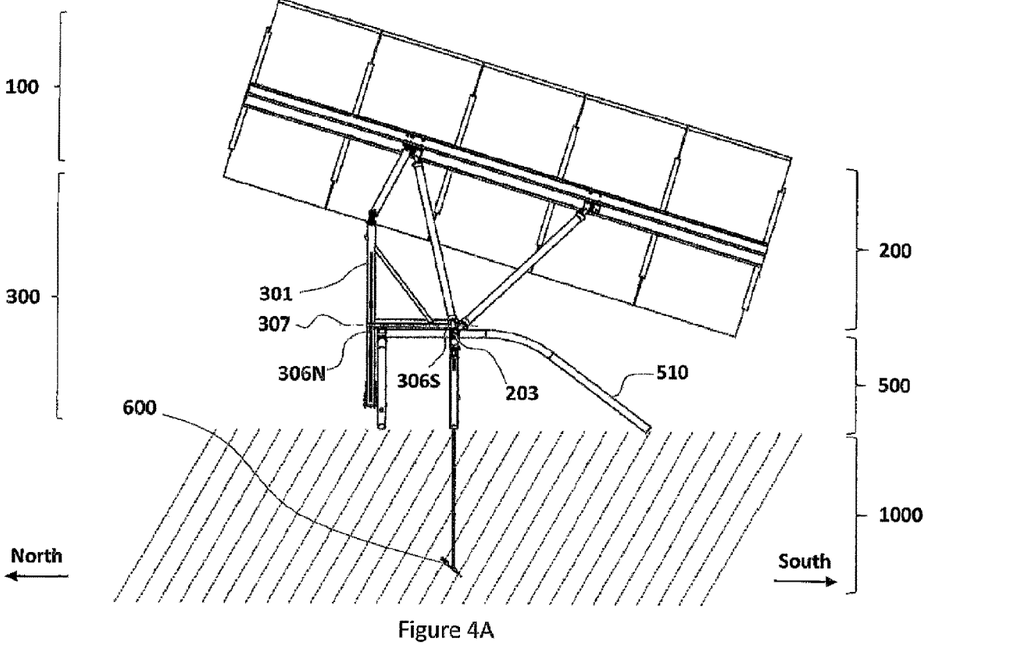
FIGS. 4A & 4B illustrate diagrams of another embodiment of a photovoltaic solar tracker unit according to the invention, comprising a chassis support structure as viewed respectively from the West and North directions.
Figure 4B:
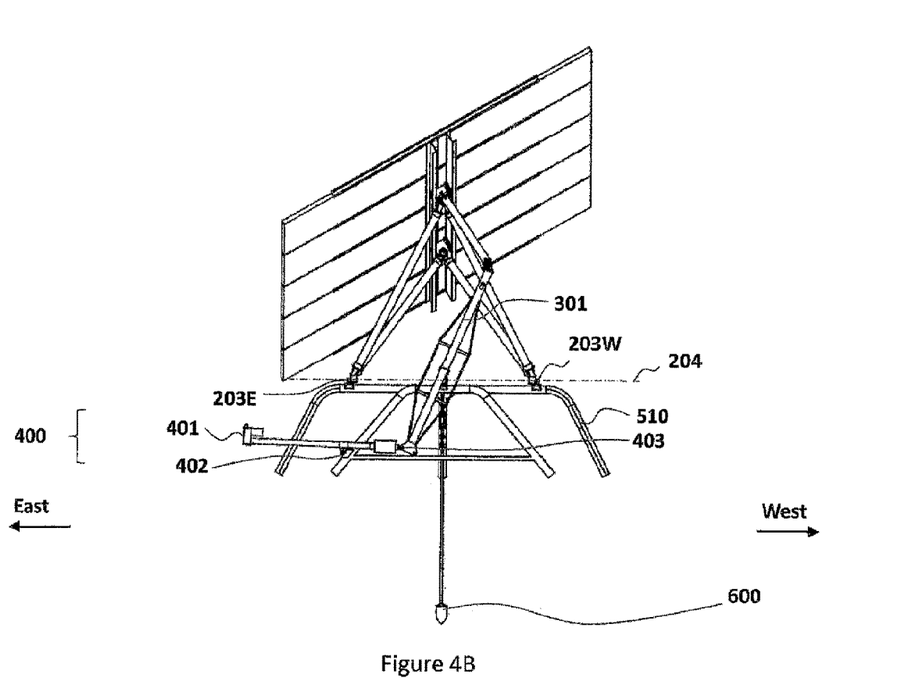

In another embodiment of the invention, the foundation 500 of the tracker consists of a chassis structure 510 which may comprise a tubular structure as illustrated in the FIGS. 4A and 4B.

In this embodiment of the invention, the mounting structure 402 of the driver 401 is operably connected to this chassis structure 510.

In this embodiment of the invention, the lower pivot points 203E and 203W of the tracker pole structure 200 and the lower pair of pivot points 306N and 306S of the lower steering arm 301 are operably connected to the tracker chassis structure 510. In this embodiment of the invention, the linkage point 403 where the driver (401) is connected to the lower steering arm 301 may be located bellow the pivoting axis 307 of the lower steering arm 301 of the herein disclosed tracker of the invention. The chassis structure may comprise multiple sub-elements such as bent steel tubes with multiple terminating ends in contact with the ground 1000.

These sub-elements may be terminated with adjustable length foots in order to compensate local variations of the ground topography and thus provide a mean for keeping the tracker structure level.

As another embodiment of the invention, the herein disclosed tracker may be secured to the ground by operably connecting the chassis structure 510 to an anchor element 600 which can be buried into the ground 1000.

A tensioning device such as an adjustable length cable tensioner may be used to apply a pre-tensioning force between tracker chassis structure 500 and the anchor element 600.

In a similar manner, a tensioning device may also be used to secure the chassis structure 510 to a single anchor point if the tracker is installed onto the surface of a building roof. The tracking accuracy of the system may be optimized if the lower steering arm 301 of the steering mechanism 300 is adjusted multiple times each year.

In yet an embodiment of the invention, multiple tracker units may be equipped with a self-locking drive mechanism which is driven by a common driver.

Such common driver may authorizes a functioning from a central position permitting either toward the East or toward the West a symmetric movement with regard to such central position.

Figure 5:
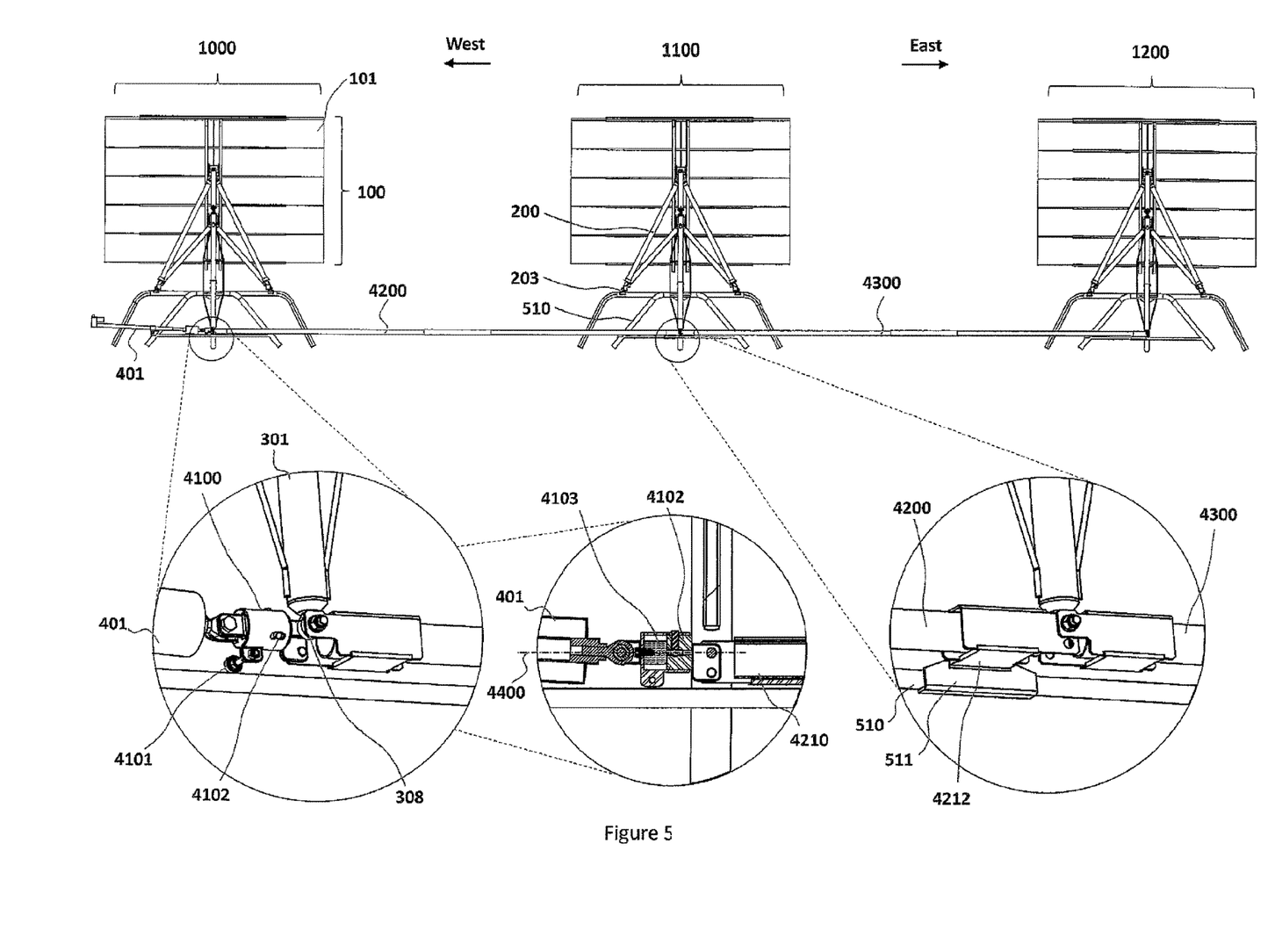
FIG. 5 illustrates diagrams of another embodiment of a tracker system of the invention having a single row comprising three mechanically linked photovoltaic solar tracker units equipped with a self-locking drive mechanism.

FIG. 5 illustrate diagrams of such an embodiment of the invention with a row of three mechanically linked 1.5-axis (one and half axis) photovoltaic solar tracker units 1000, 1100 & 1200 which are driven in unison by a common drive assembly comprising a common driver 401 and multiple transmission beams 4200 & 4300 which are equipped with mechanical locks 4212, such as, for example, triggering means which block everything together.

The transmission beams are connected together in a serial manner using a pair of pivot joints located at their ends and operably connected with spherical joint connections 308 to the lower steering arm 301 of each tracker unit.

The length of each transmission beam may be adjustable in order to accommodate some variation in height if the ground of the installation field is not flat.

As illustrated in FIG. 5, when the trackers are in their center travel position with their module support structure 100 oriented toward South (toward North when installed in the South hemisphere), the mechanical locks 4212 of each transmission beam are engaged into the locking plates 511 which are rigidly connected to the chassis structure 510 of each tracker unit.

In this center travel position, the mechanical locks 4212 are blocking the rotation of each tracker units.

In a preferred embodiment of the invention, this position is used under high wind storm conditions in order to block the rotation of each tracker unit. The moment forces induced by wind pressure onto the tracker modules 101 and support structure 100 are blocked by the locking plates 511 and thus no forces are transmitted back to the common driver.

To resume operation the tracker units under normal operating conditions, a steering actuation mechanism 4100 must be activated to release the mechanical locks 4212.

In an embodiment of the invention, the steering actuation mechanism 4100 may be mechanically actuated by the common driver 401.

FIG. 7 illustrate diagrams of such an embodiment of the invention with a steering actuation mechanism 4100 which is on one side mechanically connected to the common driver 401 and on the other side to first transmission beam 4200.

In the illustrated exemplary embodiment, the steering actuation mechanism 410 is actuated by tension or compression forces applied by the common driver 401. When no tension or compression forces are applied by the common driver 401, a compliant element 4103 brings back the steering actuation mechanism 410 into its resting (i.e. non-actuated) position.

Actuation of the steering actuation mechanism 4100 induces a rotation motion of the transmissions beams 4200 & 4300 around a rotation axis 4400 which is parallel to their main longitudinal direction. The induced rotation motion of the transmissions beams 4200 & 4300 releases the mechanical locks 4212 from the locking plates 511, thus permitting rotation of the tracker units.

In a preferred embodiment of the invention, the weight distribution of the transmissions beams 4200 & 4300 is unbalanced in order to obtain a moment from gravity forces which brings automatically back the mechanical locks 4212 of the transmissions beams 4200 & 4300 into their locked position.

In an embodiment of the invention, the steering actuation mechanism 4100 may be actuated by a separate actuator such as a motor, solenoid or other alternative means.

In a preferred embodiment of the invention, the relative position of the center of gravity of the tracker upper assembly—comprising the array of photovoltaic modules 101 and the module array support structure 100—is optimized in such a way that during normal operation of the tracker system this center of gravity point remains positioned to the South of the lower pivot point 203 of the tracker pole structure 200. When this geometrical condition is met, the overall reliability of the system is improved as gravity forces are helping the common driver 401 when the trackers are moving toward their center position where the herein disclosed the mechanical locks 4212 are blocking the rotation of each tracker units.

The trackers are therefore falling toward the front of the device in a safer position.

If under extreme conditions the linkage beam 4200 & 4300 becomes loose or broken, then the tracker units which are connected in a serial arrangement behind the broken linkage beam will naturally move into a safe wind storm position where the herein disclosed self-locking drive mechanism of the invention will prevent any further rotation of these tracker units.

Figure 6:
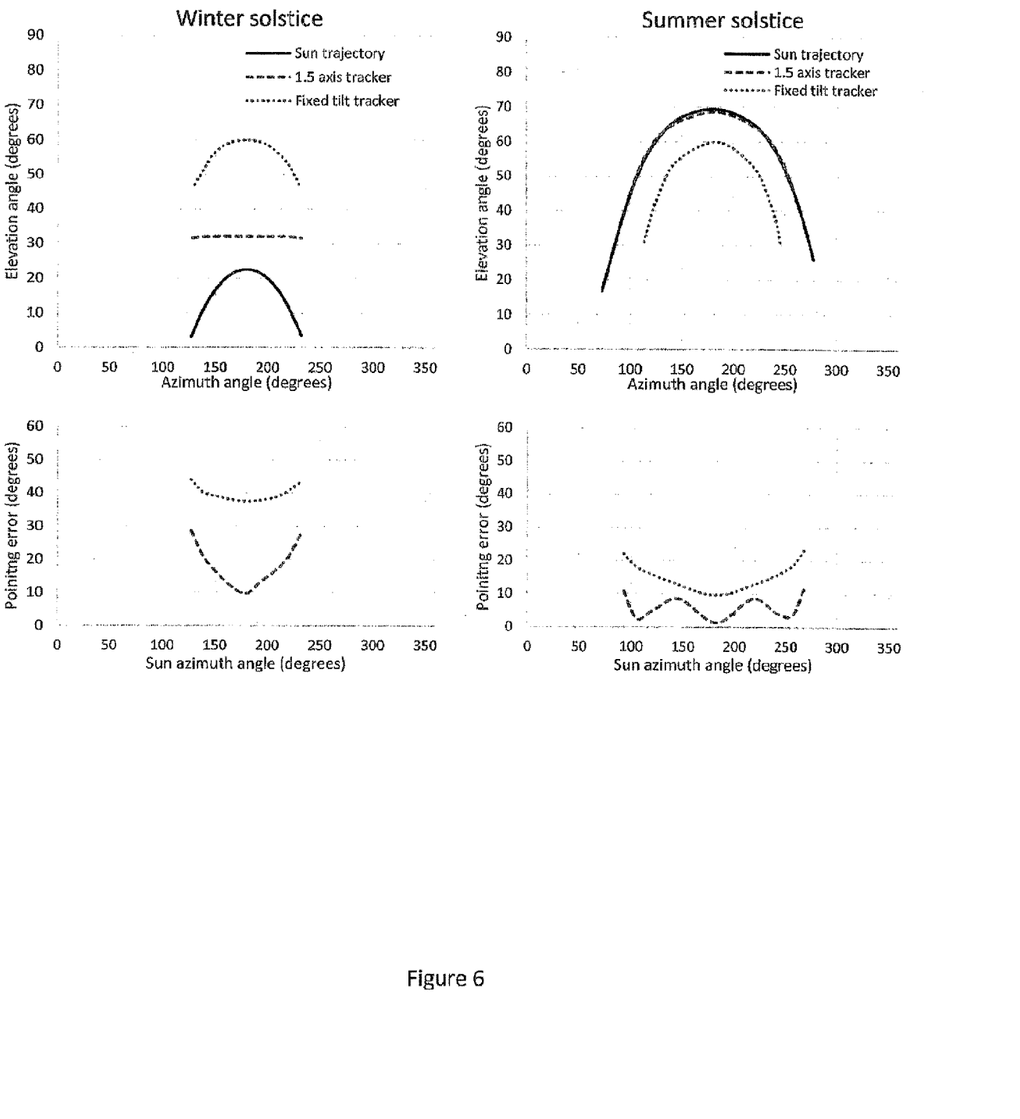
FIG. 6 illustrates Cartesian plots of the trajectories of the sun (full line), of the photovoltaic solar tracker of the invention (indicated as the 1.5 axis tracker) (interrupted line) and of prior art fixed-tilt single axis tracker dotted line) and the angular difference between the trajectories of these trackers and the sun trajectory during winter and summer solstice days, for a site located in the Northern Hemisphere at a latitude of 44° N.

As an example, FIG. 6 illustrates Cartesian plots of the trajectories of the herein disclosed 1.5-axis photovoltaic solar tracker of the invention during winter and summer solstice days for a site located in the Northern hemisphere of the earth at a latitude of 44° N. In this example, the length of the lower steering arm 301 of the steering mechanism 300 has two different length values corresponding to the Summer or Winter seasons.

The system pointing errors, showed in the bottom plots of the figure, are calculated by computing the angular difference between the trajectories of the tracker and the trajectory of the sun. These results demonstrate that the herein disclosed 1.5-axis tracker can follow the sun with a significantly improved tracking accuracy then prior art fixed-tilt single axis trackers.

The improved tracking accuracy directly translates into an overall increase of the energy generated by the photovoltaic solar modules supported by the tracking system.

The specific kinetic of the herein disclosed 1.5-axis tracker is also beneficial for reducing the system self-shadowing losses which are losses related to the overlap of the shadows cast by each tracker unit.

Figure 7A:
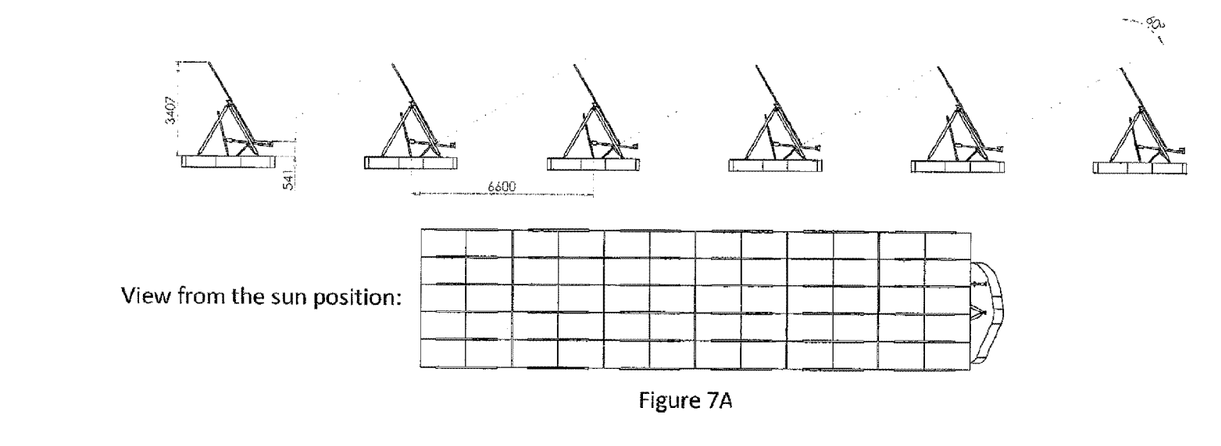
FIGS. 7A and 7B illustrate diagrams of an array of a plurality of axis trackers of the invention and an array of the same tracker units using the fixed-tilt kinetic of prior art single axis photovoltaic solar trackers. The trackers are pointing the photovoltaic modules toward the sun at an angular position of 30° in elevation above the horizon in the East direction.
Figure 7B:
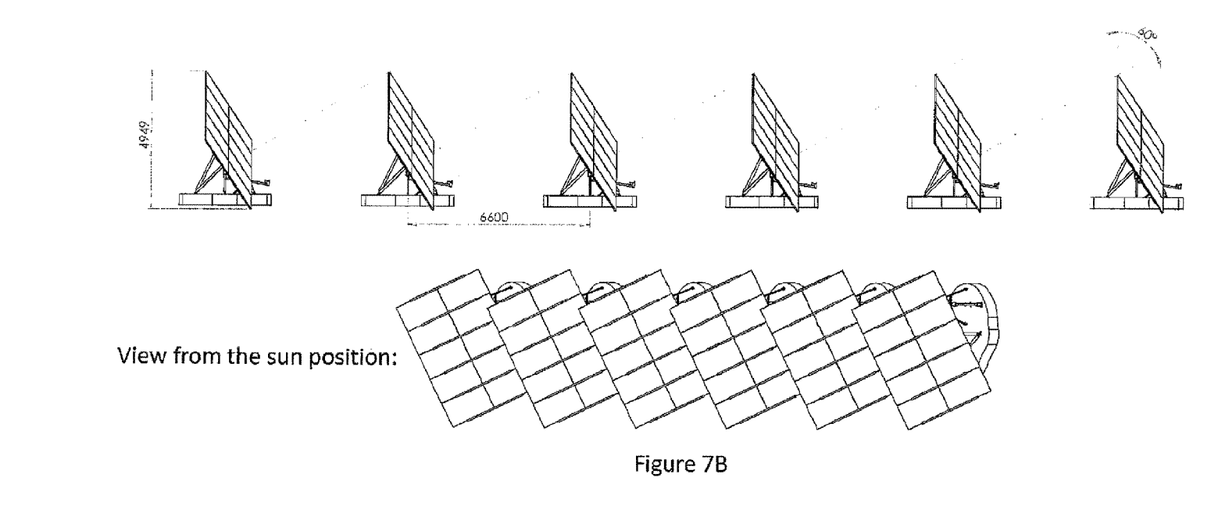

As an example, FIGS. 7A and 7B illustrate diagrams of an array of respectively the 1.5 axis trackers of the invention and the same tracker units using the kinetic of prior art fixed-tilt single axis photovoltaic solar trackers.

The tracker units are pointing their array of photovoltaic modules toward the sun which is in this example located at an angular position of 30° in elevation above the horizon in the East direction.

The lower diagram in each figure shows a view of the array of tracker units looking from the position of the sun.

The dimensions of the array of solar modules used on each tracker unit are identical, only the kinetic of the trackers has be modified in order to provide an accurate comparison of the impact of the kinetic of the two systems.

For the selected configuration of this example with each tracker unit fitted with an array of 5×2 photovoltaic solar modules, an inter-distance of 6600 mm is sufficient in order to avoid any inter-unit shadows for the 1.5-axis tracker units using the herein disclosed kinetic of the invention.

For the tracker units using the kinetic of prior art fixed-tilt kinetic, the inter-distance between the units need to be increased to a value of 7365 mm (115% more than the herein disclosed invention) in order to avoid inter-unit shadows.

As a result, the herein disclosed kinetic of the 1.5-axis tracker enable higher ground coverage ratios and thus a reduction of land area required for the solar plant.

The herein disclosed 1.5-axis solar tracker system may be installed on flat lands, slopes, uneven grounds, or on flat roofs.

The foundation of the tracker may comprise a substructure to raise the system and make this 1.5-axis solar tracker system suitable for covering a parking lot or for example for cultivating plants underneath for applications in agriculture.

The herein disclosed 1.5-axis solar tracker system is compatible with multiple foundation solutions, including but not limited to ballasted foundation blocks, screw or pile driven beams, buried ground anchors or poured concrete foundations.

Figure 8A:
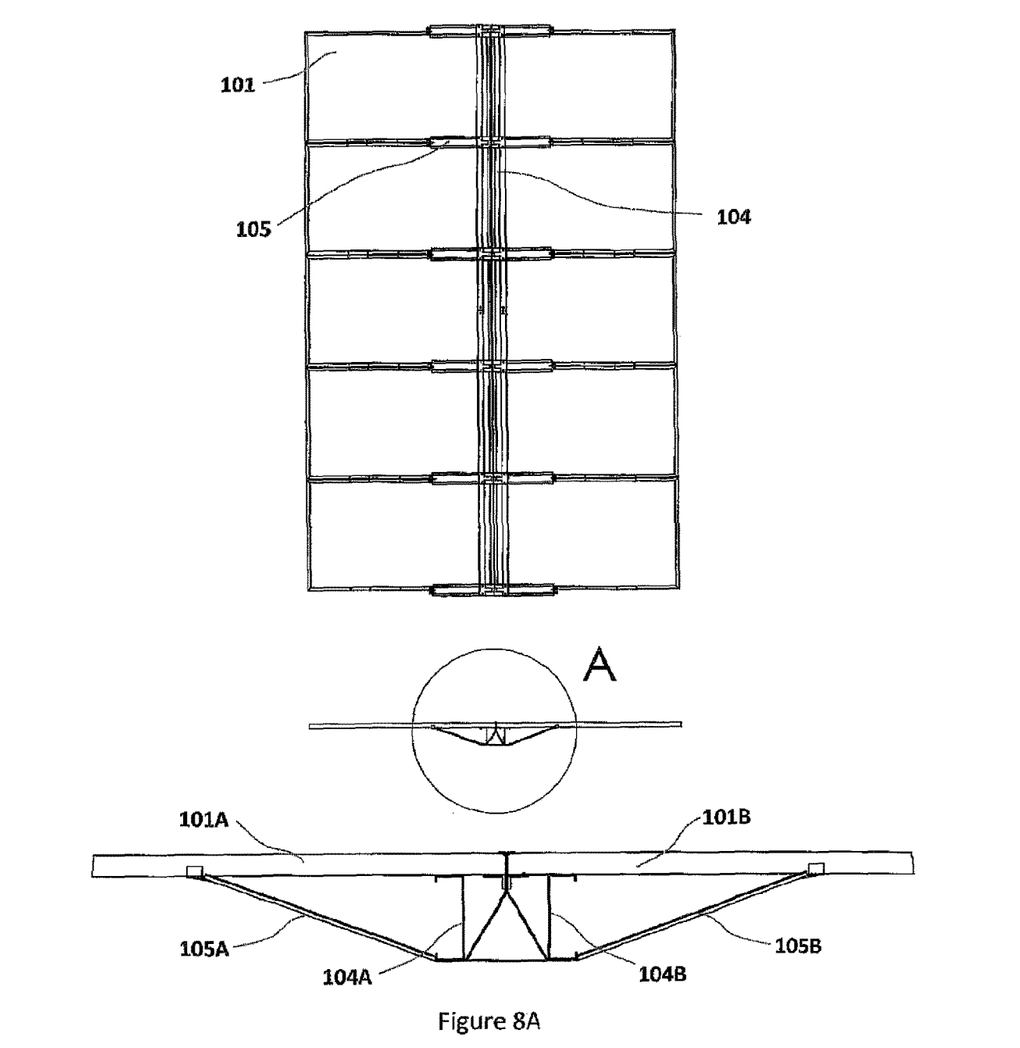
FIGS. 8A and 8B illustrate diagrams of an embodiment of an array of optimized support elements for mounting an array of photovoltaic modules attached onto the primary longitudinal support of an embodiment of the tracker system of the invention.

In another embodiment of the invention, module support elements with an optimized mechanical design may be used for mounting the array of photovoltaic modules onto the primary longitudinal support of the 1.5-axis tracker of the invention. FIG. 8A illustrate diagrams of such an embodiment of the invention as viewed from the south side and bottom side of the array of photovoltaic modules.

In this specific embodiment, each module support element 105 comprise a pair of module quick clamp support elements (105A & 105B for mounting an linear array of photovoltaic modules arranged in pairs 101A & 101B onto the primary longitudinal support 104 which comprises a pair of beam profiles 104A & 104B.

Figure 8B:
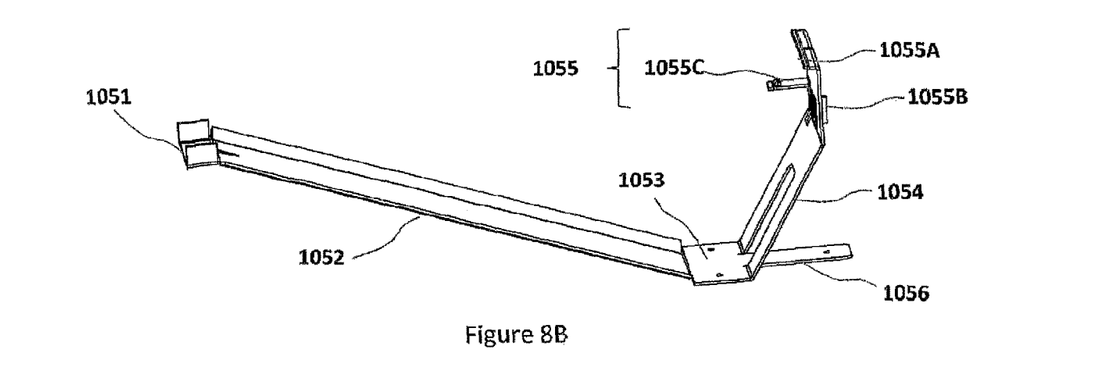

FIG. 8B provide a more detailed view of the design of an optimized module quick clamp support element 105A or 105B which combines multiple features and comprises a) a first fixture element 1051 for supporting a long edge or rail of a photovoltaic module, b) a second fixture element 1053 for attaching the quick clamp support element to the one of the primary longitudinal support beam profile 104A or 104B, and a third fixture element (1055) supporting a short edge or rail of the photovoltaic module.

In the illustrated design, the module quick clamp support element comprises a first connecting member 1052 connecting the first fixture element 1051 to the second fixture element (1053), a second connecting member 1053 connecting the second fixture element 1053 to the third fixture element 1055, and a third connecting member 1056 for connecting together a pair of quick clamp support elements.

As illustrated in FIG. 8B, the third fixture element 1055 may comprise an upper support element 1055A which is designed to be in mechanical contact with the upper surface of the photovoltaic module, a lower support element 1055B in contact with the bottom surface of the photovoltaic module, and a retention clip 1055C which is designed to temporally hold in place the photovoltaic module during the system installation phase.

Fastening elements such as bolts, metal screws or rivets are then inserted through the different holes of module quick clamp support elements in order to permanently secure the quick clamp support elements and the photovoltaic modules to the primary longitudinal support 104 of the 1.5-axis tracker of the invention.

The invention has been described with reference to various specific and preferred embodiments and techniques. However, it should be understood that variations and modifications may be made while remaining within the spirit and the scope of the invention. This invention is not to be limited by the embodiments disclosed, including any shown in the drawings or exemplified in the specification, which are given by way of example or illustration and not of limitation. The scope of the invention shall only be limited by the claims.

What is claimed is:

1. A tracking photovoltaic solar system comprising at least a tracker unit maintaining an array of photovoltaic modules aligned to the sun during the course of the day, wherein said tracker unit includes:
    a support structure, said support structure comprising a plurality of elongated elements supporting said array of photovoltaic modules and a torque tube for rigidly supporting said plurality of elongated elements and arranged to rotate along a first rotational axis,
    a pole structure operably connected to said support structure, having an upper part rotationally fixed along said first rotational axis on said support structure, and a lower part rotationally connected along a second rotational axis orthogonal to the first rotational axis on foundations,
    said foundations, and
    a steering mechanism mechanically coupling together said first and said second rotational axis for rotating said support structure and said operably connected pole structure around said first and second rotational axis in the same movement.

2. A tracking system according to claim 1, wherein the upper part of the pole structure comprises a first pair of pivot points connected to said torque tube and defining said first rotational axis of said support structure.

3. A tracking system according to claim 1, wherein the lower part of the pole structure comprises a second pair of pivots points connected to said foundations and defining the second rotational axis.

4. A tracking system according to claim 1, wherein said steering mechanism comprises an upper and a lower steering arm structures.

5. A tracking system according to claim 4, wherein said upper steering arm structure comprises an upper arm element having an upper end and a first pivot articulation at said upper-end operably connected to said torque tube, said first pivot articulation having a pivoting axis orthogonal to said first rotational axis.

6. A tracking system according to claim 4, wherein said upper arm element of said upper steering arm structure having a lower end, it comprises a spherical joint at said lower end operably connected to said lower steering arm structure.

7. A tracking system according to claim 4, wherein said lower steering arm structure having a lower end, it comprises a pair of steering pivot points at said lower end operably connected to the foundations, said steering pivot points having a pivoting axis orthogonal to said second rotational axis.

8. A tracking system according to claim 1, wherein it comprises a drive assembly, comprising a driver operably connected on one side to a mounting structure fixed onto the foundations and on the other side to said lower steering arm structure of said steering mechanism, for inducing motion to said support structure.

9. A tracking system according to claim 1, wherein the pole structure of said tracker unit comprises two pairs of mechanical beam elements, namely of first pair and a second pair, each mechanical beam element having upper and lower ends, with the upper ends of one of each pair of said mechanical beam elements connected together to a first pivot point of said first pair of pivot points connected to said torque tube, with the upper ends of the other one of each pair of said mechanical beam elements connected together to a second pivot point of said first pair of pivot points connected to said torque tube, with the lower ends of one of each pair of said mechanical beam elements connected together to a first pivot point of said second pair of pivot points, and with the lower ends of the other one of each pair of said mechanical beam elements connected together to a second pivot point of said second pair of pivot points.

10. A tracking system according to claim 1, wherein the lower steering arm of said steering mechanism comprises a pair of steering beam elements having upper and lower ends, with the upper ends of both beam elements operably connected to the upper steering arm with a spherical joint, and with the lower ends of the beam elements connected to the foundation with a pair of pivot points.

11. A tracking system according to claim 1, wherein it comprises a plurality of tracker units driven by a common driver assembly comprising a single driver and multiple transmission beams connected in a serial manner with pivot or spherical joints at their ends.

12. A tracking system according to claim 1, wherein the lengths of the upper and lower steering arm structures of the steering mechanism are arranged to provide self-locking property to the tracking system.

13. A tracking system according to claim 1, wherein the lengths of the upper and lower steering arm structures are arranged to obtain a geometrical orthogonality relation between the main longitudinal axis of these upper and lower steering arm structures when the tracker is moved to its maximum angular rotation limits at sunrise or sunset.

14. A tracking system according to claim 1, wherein it comprises a plurality of tracker units, connected together by tracker linkage beam and wherein it further comprises shock absorbing mechanical bumpers attached to each tracker unit pole structure and a mechanical locking bracket attached to each tracker linkage beam in order to mechanically lock the rotation of each tracker unit when they are moved to their end of rotation position limits.

15. A tracking system according to claim 1, wherein it comprises a plurality of tracker units, connected together by tracker linkage beams and driven in unison by a common drive assembly comprising a common driver and a self-locking drive mechanism arranged to block the orientation of the trackers in a determined position minimizing the wind influence on said common driver.

16. A tracking system according to claim 15, wherein said self-locking drive mechanism comprises a plurality of mechanical locks associated to an extremity of a respective linkage beam operably connected to the lower steering arm of each tracker unit.

17. A tracking system according to claim 16, wherein each mechanical locks is arranged to engage a corresponding locking plate rigidly connected to the chassis structure of each tracker unit to block the rotation of each tracker unit in a determined, position said mechanic locks being driven simultaneously by said common driver.

18. A tracking system according to claim 17, wherein the self-locking drive mechanism further comprises a steering actuation mechanism arranged to release the mechanical locks on demand, actuated by tension or compression forces to be applied to the common driver.

19. A tracking system according to claim 15, wherein the weight distribution of the transmission beams is unbalanced to obtain a moment gravity forces which brings automatically back the mechanical locks into their locking position.

20. A tracking system according to claim 16, wherein the tracker upper assembly formed by an array of photovoltaic modules and the module array structure having a center of gravity, said center of gravity is arranged to remains positioned to the south of the lower pivot point of the tracker pole structure.

21. A tracking system according to claim 1, wherein the second pair of pivot points being aligned along the East/West direction, and the third pair of pivot points being aligned along the direction North/South, the tracker upper assembly formed by the array of photovoltaic modules and the module array support structure having a center of gravity, the relative position of the center of gravity is arranged in such a way that during normal operation of the tracker system said center of gravity point remains positioned to the North of the lower pivot point of the tracker pole structure.

22. A tracking system according to claim 1, wherein the length of the upper or lower steering arm structures are adjustable between a minimum and a maximum length, in order to further optimize the motion trajectories of the tracker units during summer and winter seasons.

23. A tracking system according to claim 21, wherein the minimum length of said adjustable steering arm structures, is selected in order to drive the support structure to a flat horizontal position.

24. A tracking system according to claim 1, wherein the foundations of said tracking system comprises a chassis structure which comprises a tubular structure, a mounting structure for the driver, said mounting structure being operably connected to said chassis structure.

25. A tracking system according to claim 1, wherein the foundation of each tracker unit being disposed on a ground, it is secured to the ground by operably connecting each tracker unit foundation to anchor elements buried into the ground underneath each tracker unit.

26. A tracking system according to claim 1, wherein each elongated element of said plurality of elongated elements supporting said array of photovoltaic modules comprises a pair of module quick clamp support elements, wherein each module quick clamp support element comprises a first fixture element for supporting a long edge or rail of a photovoltaic module, a second fixture element for attaching the quick clamp support element to the torque tube and a third fixture element supporting the short edge or rail of the photovoltaic module.

* * * * *